June 8, 1937.    M. A. WOOD    2,083,415

MOUNTING MEANS FOR ELECTRICAL SWITCH BOXES AND THE LIKE

Filed Dec. 10, 1934

INVENTOR
MERRILL A. WOOD
BY D. Clyde Jones
ATTORNEY

Patented June 8, 1937

2,083,415

UNITED STATES PATENT OFFICE 2,083,415

MOUNTING MEANS FOR ELECTRICAL SWITCH BOXES AND THE LIKE

Merrill A. Wood, Rochester, N. Y.

Application December 10, 1934, Serial No. 756,785

3 Claims. (Cl. 247—21)

This invention relates to attaching means for a wall plate or an inset wall receptacle, such as an electrical junction box.

In the past it has been necessary in attaching register fronts and electrical junction boxes to the walls of a house to fasten them by means of screws passing into the structure of the walls. Since such walls are usually made of metal or wood lath with plaster applied thereto or else are made of plaster or fiber board, such material is ill-adapted to receive and permanently hold such screws, since frequently the wall material at the point where it is necessary to insert the screws, becomes so mutilated, that it becomes necessary to insert a wood strip into the wall in order to provide suitable means to receive the attaching screws. Such an expedient requires considerable time, so that workmen rather than spend this time, will leave an outlet box knowing that it is improperly secured in the wall, if they believe that it will be unobserved by the electrical inspector.

Various arrangements have been proposed to obviate this difficulty, but all such means have required modification in the structure of the outlet box itself.

The present invention has for its purpose, attaching means for an electrical junction or outlet box, a wall register or the like, which requires no change in construction of the article to be fastened to the wall, which attaching means is inexpensive to manufacture, simple to apply and which will hold the article securely attached to the wall.

Figure 1:
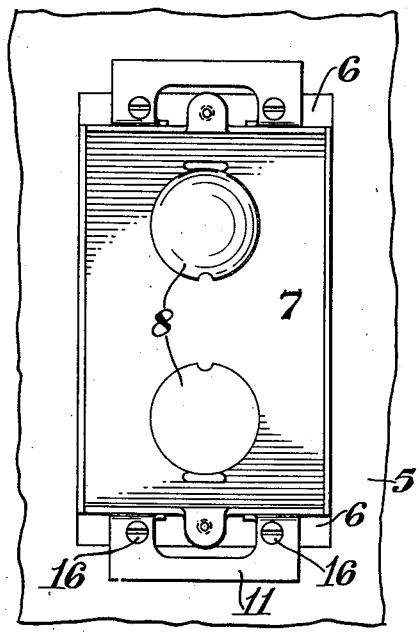
Figure 2:
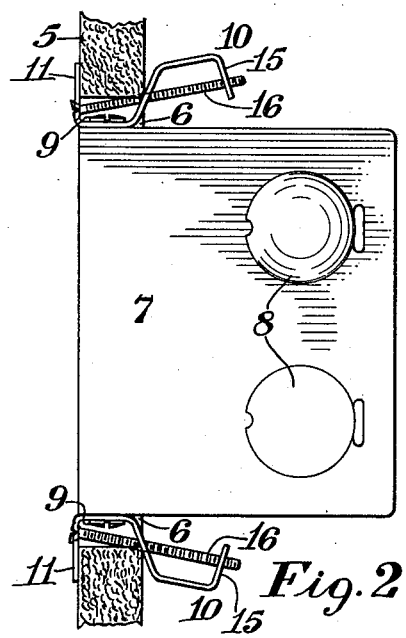
Figure 4:
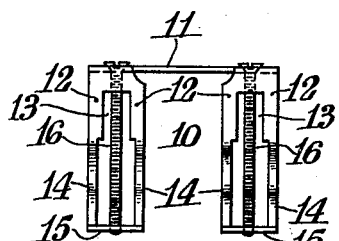
Figure 6:
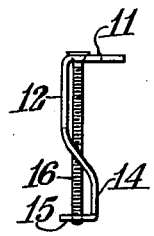
Figure 3:
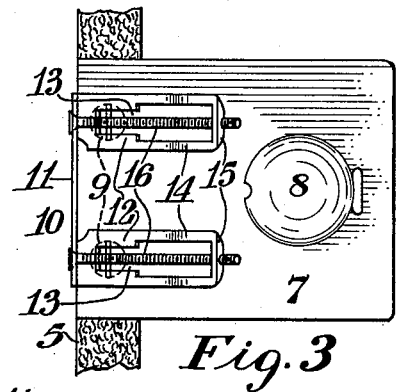
Figure 5:
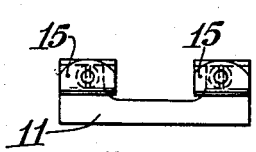
Figures 7, 8:
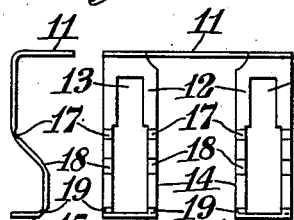
Figure 9:
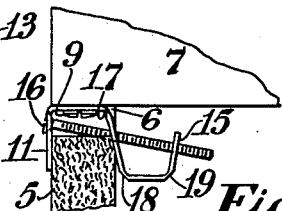

Various features and advantages of the invention will appear from the detailed description and claims when taken with the drawing, in which Fig. 1 is a front view of a wall section having an electrical junction box mounted in an opening therein, which junction box is securely held in the wall by the attaching means of the present invention; Fig. 2 is a side view of an outlet box mounted in an opening in the wall, showing the attaching means in its position of final adjustment for holding the box in the wall opening; Fig. 3 is an end view of an outlet box mounted in a wall with a portion of the wall broken away to show the position of the attaching means mounted at one end of the outlet box; Fig. 4 is a plan view of the attaching unit of the present invention; while Figs. 5 and 6 are respectively end and side views thereof; Figs. 7 and 8 are respectively a side view and a plan view of a slightly modified form of attaching means; and Fig. 9 is a fragmentary view showing a portion of a junction box with a modified unit attached thereto and adjusted to grip the wall.

In the drawing, 5 designates plaster board or fiber board of the usual wall construction, in which there is provided an opening 6 of a width just sufficient to receive the junction box 7, whereas, the length of this opening is slightly longer than the length of the box as best shown in Fig. 2, to provide space for the insertion of the box and its attaching means. As is well known, the outlet box comprises a metal receptacle closed at its bottom, sides and ends but open at the top, the bottom, sides and ends of the box being provided with weakened portions 8 which can be easily broken out to permit the insertion of the ends of the electrical conduits (not shown) into the box. Each end of the outlet box is provided with a pair of spaced screws 9 by which former metal attaching pieces have been fastened thereto.

In accordance with the present invention, these former attaching pieces are replaced at each end of the box by a one-piece attaching unit generally designated 10. This attaching unit is stamped from ordinary flat metal stock and is thereafter formed in accordance with the usual practice, to the shape illustrated. This unit includes a flat flange 11 adapted to press against the exposed face of the wall 5 while from one of the edges of the flange there project a pair of legs 12 extending generally at right angles to the principal plane of the flange. Each leg is provided with a notch 13 open at one end and of sufficient width so that the shank of a screw 9 will pass therethrough, but not the head of the screw. At a point beyond the notch 13 with respect to the flange 11, the leg 12 is formed into two narrow strips 14 curved away from the main axis of the leg and then terminating in a flange 15 which extends in a plane generally parallel to that of the flange 11. The flange 11 has a pair of screw openings therein to receive screws 16 while each flange 15 has a threaded opening therein in alinement with a screw opening in the flange 11 and adapted to receive the threaded portion of the screw 16. It should be noted that the portions 14 of each leg are of such reduced cross section and are so offset from the main plane of the leg, that these portions will tend to buckle when their related screw 16 is tightened as will be further pointed out.

In mounting a junction box or the like in the wall 5 by means of the present invention, an opening 6 is cut into the wall, the approximate dimensions of which opening will be obvious from Figs. 2 and 3. A unit 10 is then fastened to each end of the junction box by loosening the pairs of screws 9 in each end thereof until the heads of adjacent screws can be inserted in the notches 13 in the legs of each unit, and thereafter, these screws are tightened up. The outlet box with a unit 10 fastened at each end thereof is then forced into the opening in the wall. At this time the flanges 15 as indicated best in Fig. 6 do not project materially beyond the ends of the outlet box, so that the length of the opening does not need to be materially greater than the length of the box. When the box has thus been inserted into the opening, the flanges 11 of the attaching units 10 at the respective ends of the box, engage the exposed surface of the wall 5. The workman will then tighten up the screws 16 of which there is one for each leg of the unit, that is two screws for each unit. As each screw tightens up, its related flange 15 will be drawn toward the flange 11 of the unit with the result that each of the legs 12 will tend to buckle or bow along the narrowed portion 14 thereof until these portions grip the inner surface of the wall as indicated in Fig. 2, at which time the unit in side view assumes generally the shape of a letter S. It will be noted that after the screw has been properly tightened to a degree such that the unit grips not only the exposed surface but the rear surface of the wall 5, the screw 16 which originally extended at right angles to the plane of the flange 11, will be inclined thereto as shown in Fig. 2, so that it will engage and tend to force itself into the edge of the material at the opening in the wall.

The modified unit 10 illustrated in Figs. 7, 8, and 9, differs from that already described by providing the legs 12 and the strips 14 thereof with lines of weakness 17, 18 and 19 to predetermine the location of the folds in the legs when the screws 16 are tightened. The gripping position of the unit when adjusted is shown in Fig. 9.

While the invention is particularly adapted for fastening electrical junction or outlet boxes in an opening in a wall structure, the invention is equally adaptable for fastening the face plate of a wall register into the opening in a wall.

From the foregoing it will be seen that an integral attaching means for a wall receptacle is provided which does not require any change whatsoever in the present construction of the receptacle, but is readily applied to existing receptacles, so that a receptacle can be quickly and securely mounted in position in a wall opening without the difficulties now encountered under the present practice.

What I claim is:

1. In combination with a junction box or the like, a screw threaded into each end of said box, an integral metallic attaching strip having a notch therein to receive the head of one of said screws so that said strip is detachably connected to said box, each strip having end flanges connected by weakened portions, and a bolt engaging said flanges to draw the same toward each other by bending said portions.

2. In combination with a junction box or the like, an integral metallic attaching piece connected to each end of said box, each piece comprising a flange, two pairs of weakened legs extending from one edge of said flange in a plane intersecting the plane of said flange, each pair of legs terminating in a flange extending generally parallel to said first mentioned flange, and a bolt associated with each pair of legs and engaging the flanges thereof to draw said flanges toward each other.

3. An article of manufacture comprising an integral S-shaped attaching piece for fastening a junction box or the like to a wall, said piece having a slot in its intermediate portion and means passing through said slot and engaging the end portions of said piece to draw said end portions toward each other.

MERRILL A. WOOD.